US005609408A

United States Patent [19]

Targetti

[11] Patent Number: 5,609,408

[45] Date of Patent: Mar. 11, 1997

[54] DEVICE FOR ORIENTING A LIGHTING APPARATUS SUCH AS, IN PARTICULAR BUT NOT EXCLUSIVELY, AN ENCASED LAMP, SUITED FOR BOTH MANUAL AND MOTORISED ADJUSTMENT

[75] Inventor: Paolo Targetti, Florence, Italy

[73] Assignee: Targetti Sankey S.p.A., Florence, Italy

[21] Appl. No.: 626,373

[22] Filed: Apr. 2, 1996

[30] Foreign Application Priority Data

Apr. 5, 1995 [IT] Italy ................................ FI95U0033

[51] Int. Cl.[6] ...................................................... B60Q 1/06

[52] U.S. Cl. ........................... 362/66; 362/286; 362/287; 362/364

[58] Field of Search ............................ 362/69, 423, 286, 362/287, 364, 66

[56] References Cited

U.S. PATENT DOCUMENTS

| | | | |
|---|---|---|---|
| 2,362,110 | 11/1944 | Meyerhoefer | 362/365 |
| 2,401,390 | 6/1946 | Unger | 362/365 |
| 3,778,609 | 12/1973 | Liberman . | |
| 4,930,057 | 5/1990 | Williams . | |

FOREIGN PATENT DOCUMENTS 0567739 11/1993 European Pat. Off. .

*Primary Examiner*—Carroll Dority
*Attorney, Agent, or Firm*—Browdy and Neimark

[57] ABSTRACT

An orientation device applied to a lighting apparatus comprising a fixed support (1) to which is attached in a rotatable manner a mobile support (2) comprising a plate (3) and an ogive wall (4) to the inside of which a spotlight (5) with the relative light socket (6) is fixed. The rotatable connection (7) between the mobile support (2) and the fixed support (1) makes it possible to extract the first from the second. The fixed support (1) comprises an external ring (8) in which an internal ring (9) engages circumferentially in a sliding manner. To the internal ring (9) is fixed the end (11*a*) of a rack (11) which is curved in a circular arc and which meshes with a pinion (14) connected in a rotatable and frictioned manner to the mobile support (2). The extraction of the light is easily carried out from the outside without having to dismount the lamp or intervene on the locking means and, furthermore, can be motorised.

20 Claims, 1 Drawing Sheet

DEVICE FOR ORIENTING A LIGHTING APPARATUS SUCH AS, IN PARTICULAR BUT NOT EXCLUSIVELY, AN ENCASED LAMP, SUITED FOR BOTH MANUAL AND MOTORISED ADJUSTMENT

DESCRIPTION

1. Field of the Invention

The present invention relates to the field of lighting and more precisely it relates to an orientation device for a lighting apparatus such as, in particular but not exclusively, an encased lamp, suited for both manual and motorised adjustment.

2. Description of the Prior Art

In the field of lighting many types of systems are known for the orientation of lights with respect to the supports holding them which make it possible to direct light rays where desired.

With particular regard to encased lamps, these comprise a spotlight fixed to the inside of a fixed support, which normally is a ring shaped support suited to engage in a seat formed in a wall or ceiling of the space to be illuminated.

There exist lamps suitable to being encased, in which the spotlight is in a fixed position with respect to the fixed support, whereas in many other types of lamps the spotlight can be oriented with respect to the fixed support.

In one type of lamp in which the spotlight can be oriented, the same is mounted in a mobile support of a tubular form, substantially in the shape of an elbow, which is able to slide in an arcuate guide connected to the fixed support. The sliding point of connection between the guide and the mobile support moves integrally with the latter along a curvilinear trajectory defined by the arc shaped guide, thus allowing the entire mobile support to rotate around an ideal point in space, with the result of an extraction movement (and the inverse) of the mobile support relative to the fixed support. The arcuate guide can, in turn, rotate axially 360° with respect to the fixed support since it is integral with an annular element which engages circumferentially in a sliding manner in an annular seat formed in the fixed support itself. The orientation consists, therefore, in an extraction movement (and the inverse) and a movement of axial rotation.

The type of lamp just described has, however, the inconvenience that, in order for the mobile support to be extracted (and the inverse), it is usually necessary to intervene on a locking screw which, when the encased lamp is already mounted, is difficult to access and, in any case, cannot be reached without dismounting the entire lamp from its seat. In fact, even if it is possible not to tighten the locking screw forcefully, in order to allow the movement of the mobile support and thus extract (or insert) the spotlight, in exerting force on the mobile support from the outside, two distinct inconveniences occur in any case. The first is that the locking screw loosens easily, for example with the use or in the presence of vibrations, causing an undesired change of position of the spotlight. Second, having to exert force on the mobile support, if the locking screw is not sufficiently loosened, the arcuate guide can become deformed and consequently knock against the mobile support itself.

In another type of existing lamp, the elbow shaped mobile support is hinged to the fixed support, and can be locked in a chosen position by means of a screw or clamp which causes the interference of a frictional element against the external surface of the mobile support itself. One inconvenience of this type of lamp is that, every time one wishes to vary its orientation by changing the degree of extraction of the mobile support with respect to the fixed support, it is necessary to intervene on this screw or clamp to release the rotation and then newly intervene to lock it into the new position. Moreover, the frictional element can cause scratches in the colour finish of the mobile support thus damaging its aesthetic value.

In a further type of lamp in which the spotlight can be oriented, as described in the patent application in the same name as the present applicant and filed on the same date, the mobile support is connected in a rotatable manner to the fixed support to allow the extraction movement and an arcuate rod is provided concentric with the rotatable point of connection of the mobile support with respect to the fixed support and integral with the fixed support. On the rod, a vice integral with the mobile support engages in a frictioned sliding manner. The rod consists preferably in an arcuate cylindrical element which engages in a rectilinear hole formed in the vice, so that the frictioned sliding results from the friction between the curved tract of the rod and the cylindrical walls of the hole.

In the three types of orientable lamps mentioned above, however, it is not possible to vary the degree of extraction with a motorised control.

On the other hand, even though various systems of lamps with motorised orientation control currently exist, they are extremely complex and are not suited for orientation that is contemporaneously or alternatively manual and/or motorised.

SUMMARY OF THE INVENTION

One object of the present invention is to provide a device for orienting a lighting apparatus that is easily manually manoeuvred by both the person installing it and the person using it, without having to act on locking means or dismount the lamp in any way.

A further object of the present invention is to provide a structure for said lamp which, at the same time, allows for the variation of the degree of extraction of the mobile support with a motorised control without having to make substantial modifications in the same.

These objects are accomplished by the device according to the invention the novel feature of which is that the mobile support is connected in a rotatable manner to the fixed support in order to be able to vary the degree of its extraction with respect to the latter, and that it is provided with an arcuate rack concentric with the point of rotatable connection of the mobile support with respect to the fixed support and integral with the fixed support, on said rack meshing a pinion connected in a rotatable and braked manner to the mobile support.

Advantageously, the pinion is set in rotation by an electric motor-reducer integral with said mobile support.

The fixed support is preferably formed by an external ring, which can be encased in a wall, and an internal ring which circumferentially engages in a sliding manner in the external ring.

BRIEF DESCRIPTION OF THE DRAWINGS

The invention will now be illustrated with the following description of one of its possible embodiments, given as an example and not limitative, with reference to the attached drawings in which.

DESCRIPTION OF THE PREFERRED EMBODIMENT

Figure 1:
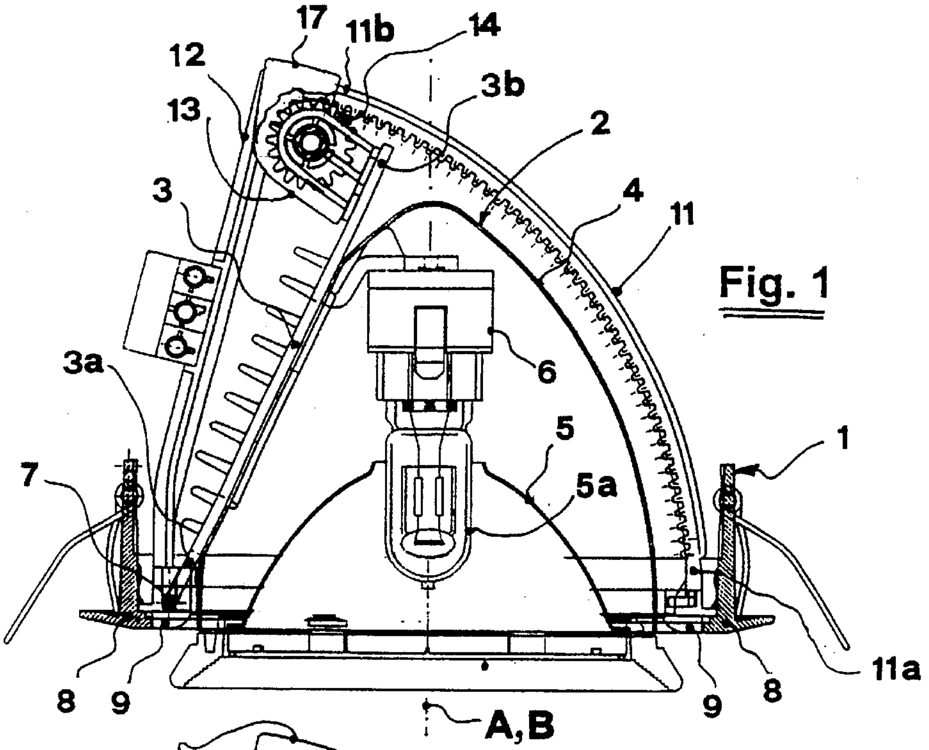
FIG. 1 is a sectional view according to a diametrical plane of an encasement lamp with an orientation device according to the invention.

With reference to the above-mentioned figures, an orientation device according to the invention is applied to a lighting apparatus of the type to be encased in a wall or ceiling comprising a fixed support 1 to which is connected in a rotatable manner a mobile support 2 comprising a plate 3 and an ogive wall 4 to the internal part of which is fixed a spotlight 5 with a light source 5*a* and the relative light socket 6.

The rotatable connection between mobile support 2 and fixed support 1, which allows for the variation of the degree of extraction of the former from the latter, occurs by means of a pivot 7 provided at one end 3*a* of plate 3.

Fixed support 1 comprises an external ring 8, necessary for fixing the apparatus in an encased position, and an internal ring 9 which engages circumferentially in a sliding manner in external ring 8 allowing for a rotation of 360° around axis A.

To the internal ring 9, which is integral with pivot7, is fixed end 11*a* of a rack 11 curved in a circular arc with its centre geometrically coincident with pivot 7. Rack 11 is kept rigid by means of a reinforcing arm 12 integral with internal ring 9 and its end 11*b*.

To plate 3, in correspondence with end 3*b* opposite to end 3*a* which is connected in a rotatable manner to fixed support 1, is integrally fixed a rotation seat 13 for a pinion 14 which meshes with rack 11 being braked by means of a Belleville washer locked by means of a self-locking nut which, for the sake of simplicity, is not shown. Furthermore, a sliding block 17 integral with the rotation seat 13 slides against the external edge of rack 11 assuring its meshing with pinion 14.

Figure 2:
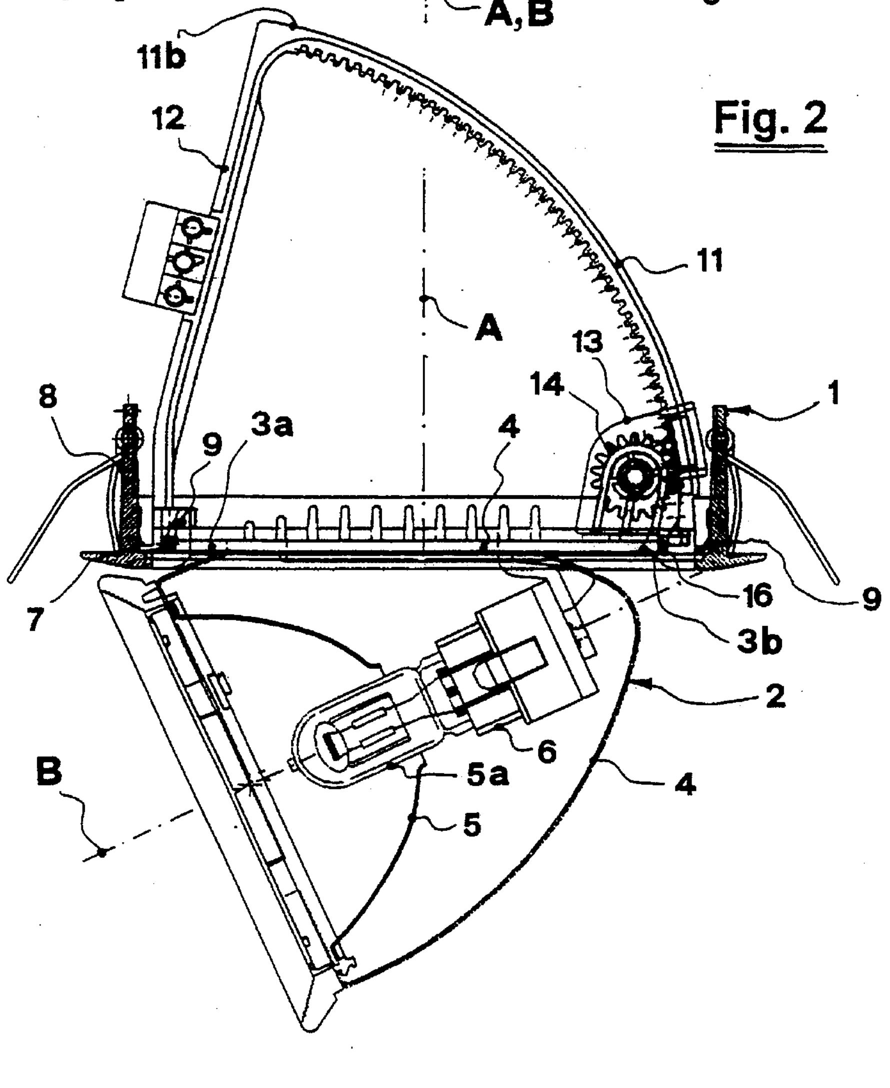
FIG. 2 shows the lamp of FIG. 1 with an orientation device according to the invention illustrated in a different operative position.

As illustrated in FIG. 2, it is possible to rotate the mobile support 2 in a position in which axis B of spotlight 5 has the maximum inclination with respect to axis A of fixed support 1 starting from a position (FIG. 1) in which axis B of spotlight 5 was substantially coincident with axis A of fixed support 2.

In the position of maximum inclination of FIG. 2, end 3*b* of plate 3 abuts against a step 16 provided inside internal ring 9 of fixed support 1.

The frictioned rotation of pinion 14 on rack 11 makes it possible for the user to vary the degree of extraction of spotlight 5 orienting it in the desired direction simply by gripping mobile support 2 and extracting it or replacing it with a minimum effort with respect to pivot7 in any stable position desired. In fact, in this way, axis B is oriented in the direction in which one wishes to direct the light, shifting it from axis A according to any angle comprised between the two extreme positions.

The main advantage of the device according to the invention is that, after the rotation of extraction or insertion carried out by the user, the position reached by the spotlight is absolutely stabile even in the presence of vibrations, thanks to the frictioned coupling of the pinion with the rack. At the same time, it is extremely simple to move the spotlight to a new position without having to dismount the lamp or intervene on the locking means. The pinion 14, furthermore, does not require any subsequent adjustment, given that the resistance to rolling on rack 11 can be chosen during installation by, for example, tightening or loosening the Belleville washer in an opportune manner by means of the self-locking nut which holds it.

The device according to the present invention is, furthermore, particularly advantageous since it allows for the motorization of the regulation of the degree of extraction of the lamp without having to substantially modify the structure of the same. In fact, it is sufficient to mount an electric geared motor integral to mobile support 2 and coaxial to pinion 14. This does not imply any modification of the structure of the lighting apparatus which can be sold as a manual apparatus with optional motorization. In this last case, the regulation of the degree of extraction can be remote controlled with means of a known type not, therefore, described in detail.

The foregoing description of the specific embodiment will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

I claim:

1. Orientation device of a lighting apparatus, said apparatus comprising:

a fixed support;

a mobile support connected to said fixed support in a rotatable manner about a pivot by virtue of which an extraction movement of the latter with respect to the former is allowed for;

at least one spotlight or similar light source connected to said mobile support;

an arcuate rack integral to said fixed support and concentric to said pivot; and a pinion meshing on said rack and connected in a rotatable manner to said mobile support.

2. Device according to claim 1 wherein said pinion is connected in a rotatable manner to said mobile support by means of a braked coupling.

3. Device according to claim 1 wherein said pinion is set in rotation by a motor-reductor integral with said mobile support.

4. Device according to claim 1 wherein said fixed support comprises an external ring for encasing said lighting apparatus in a fixed manner and an internal ring which engages circumferentially in a sliding manner in said external ring, said mobile support and said rack being fixed to said internal ring.

5. Device according to claim 1 wherein a sliding block is provided integral with said mobile support and sliding externally on said rack thus ensuring the meshing of said pinion.

6. Device according to claim 1 wherein said mobile support comprises a stiffening arm connecting said rack and said internal ring.

7. Device according to claim 2 wherein said pinion which meshes with said rack is braked by means of a Belleville washer locked by means of a self-locking nut.

8. Device according to claim 1 wherein said mobile support comprises an ogive wall in which said spotlight is located and a plate which is integral with said ogive wall, and comprises, at one end, a seat for the rolling of said pinion and, at the other end, said rotation pivot for the rotatable connection to said fixed support.

9. Device according to claim 8, wherein said plate is suited to abut against a step formed on the inside of said fixed support.

10. Device according to claim 4, wherein a sliding block is provided integral with said mobile support and sliding externally on said rack thus ensuring the meshing of said pinion.

11. Device according to claim 10, wherein said mobile support comprises a stiffening arm connecting said rack and said internal ring.

12. Device according to claim 11, wherein said mobile support comprises an ogive wall in which said spotlight and a plate which is integral with said ogive wall and comprises, at one end, a seat for the rolling of said pinion and, at the other end, said rotation pivot for the rotatable connection to said fixed support.

13. Device according to claim 12, wherein said plate is suited to abut against a step formed on the inside of said fixed support.

14. Device according to claim 13, wherein said pinion is connected in a rotatable manner to said mobile support by means of braked coupling.

15. Device according to claim 13, wherein said pinion is set in rotation by a motor-reductor integral with said mobile support.

16. Device according to claim 5, wherein said mobile support comprises a stiffening arm connecting said rack and said internal ring.

17. Device according to claim 4, wherein said mobile support comprises an ogive wall in which said spotlight and a plate which is integral with said ogive wall and comprises, at one end, a seat for the rolling of said pinion and, at the other end, said rotation pivot for the rotatable connection to said fixed support.

18. Device according to claim 5, wherein said mobile support comprises an ogive wall in which said spotlight and a plate which is integral with said ogive wall and comprises, at one end, a seat for the rolling of said pinion and, at the other end, said rotation pivot for the rotatable connection to said fixed support.

19. Device according to claim 6, wherein said mobile support comprises an ogive wall in which said spotlight and a plate which is integral with said ogive wall and comprises, at one end, a seat for the rolling of said pinion and, at the other end, said rotation pivot for the rotatable connection to said fixed support.

20. Device according to claim 10, wherein said mobile support comprises an ogive wall in which said spotlight and a plate which is integral with said ogive wall and comprises, at one end, a seat for the rolling of said pinion and, at the other end, said rotation pivot for the rotatable connection to said fixed support.

* * * * *